No. 824,938. PATENTED JULY 3, 1906.
A. LANG.
HEATING DEVICE FOR TINS.
APPLICATION FILED MAR. 12, 1906.

Witnesses:-
Henry Thieme.
F. George Barry.

Inventor:-
Albert Lang
by attorneys
Brown & Seward

UNITED STATES PATENT OFFICE.

ALBERT LANG, OF KARLSRUHE, GERMANY, ASSIGNOR TO BLECHWAREN-FABRIK LIMBURG (JOSEPH HEPPEL) G. M. B. H., OF LIMBURG, GERMANY, A CORPORATION.

HEATING DEVICE FOR TINS.

No. 824,938.　　　Specification of Letters Patent.　　　Patented July 3, 1906.

Application filed March 12, 1906. Serial No. 305,490.

*To all whom it may concern:*

Be it known that I, ALBERT LANG, doctor of philosophy, chemist, professor at the Technical High School, and a resident of 7 Weberstrasse, Karlsruhe, in the Grand Duchy of Baden, German Empire, have invented new and useful Improvements in Heating Devices for Tins, of which the following is a specification.

My invention relates to preserved-food tins to which a heating device is applied.

According to my invention, a cartridge filled with a chemical compound which heats by glowing without flame is used. The cartridge is placed in a cavity in the bottom of the tin and is covered by a lid. A fuse or slow match is used to set the contents of the cartridge alight without removing the bottom lid.

Figure 1:
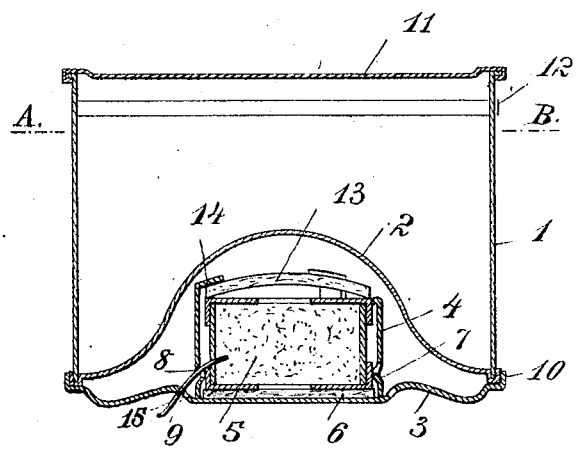
Figure 2:
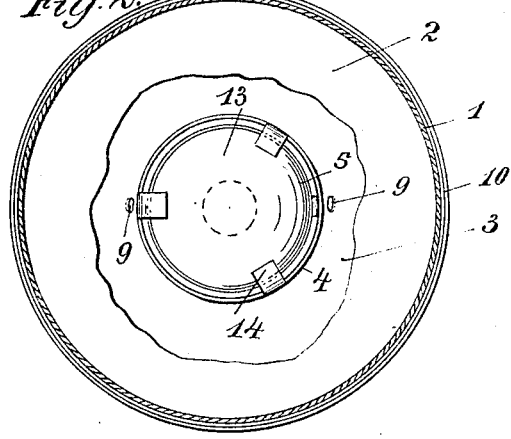

In the accompanying drawings, Figure 1 is a section, and Fig. 2 a plan view, partially in section.

1 is the tin, 2 the rounded bottom of the tin, and 3 the lid covering the cavity formed in the rounded bottom. Fixed to the lid 3 is a ring 4, having a collar 7 to hold the cartridge 5. A plate 6, of refractory material, is placed under the cartridge to prevent radiation of heat. Holes 8 in the ring and 9 in the lid serve for the introduction of a slow match or fuse 15 from the outside into the cartridge to allow of its being kindled from the outside without removing the lid 3. The cartridge is open at its top and is covered by a bent plate 13, of refractory material, in order to soften the radiation of heat and prevent destruction of the bottom 2 of the tin. This plate 13, of refractory material, is held in position by bent fingers 14 of the ring 4. The parts 1, 2, and 3 and the cover 11 are united in the usual way, and the tin is opened in the usual way by tearing off the band 12.

In using the tin the band 12 is torn off and the cartridge kindled by the fuse or slow match 15. After three or four minutes' time the contents of the tin are heated to 70° to 80° centigrade.

The tin may be used for heating tea or coffee after emptying and cleaning it, as the development of heat continues for some time by the cartridge.

What I claim is—

1. The combination with a preserved-food tin having a rounded bottom forming a cavity and a lid covering the cavity, of a cartridge of heating material located in said cavity and a ring fixed to said lid arranged to hold the cartridge in place, said ring and lid having holes therethrough for the insertion of a slow match or fuse into the said cartridge without removing the lid.

2. The combination with a preserved-food tin having a rounded bottom forming a cavity and a lid covering the cavity, of a cartridge of heating material located in said cavity, a ring fixed to said lid arranged to hold the cartridge in place, fingers on the said ring and a plate of refractory material held in position between the cartridge and the bottom of the tin by said ring-fingers.

3. The combination with a preserved-food tin having a rounded bottom forming a cavity and a lid covering the cavity, of a cartridge of heating material located in said cavity, a ring fixed on said lid arranged to hold the cartridge in position, fingers on said ring, a plate of refractory material held in position between the cartridge and the bottom of the tin by said fingers and a second plate of refractory material interposed between the bottom of the cartridge and the bottom lid.

In testimony that I claim the foregoing as my invention I have signed my name, in presence of two witnesses, this 22d day of February, 1906.

ALBERT LANG.

Witnesses:
WILHELM FÖHNER,
JOS. H. LEULÉ.